United States Patent
Zhang

(10) Patent No.: US 7,901,506 B2
(45) Date of Patent: Mar. 8, 2011

(54) CEMENTITIOUS CAPILLARY CRYSTALLINE WATERPROOF MATERIAL WITH AN EKA-MOLECULAR SIEVE STRUCTURE AND ITS MANUFACTURING METHOD

(76) Inventor: Huidong Zhang, Tianjin (CN)

( * ) Notice: Subject to any disclaimer, the term of this patent is extended or adjusted under 35 U.S.C. 154(b) by 0 days.

(21) Appl. No.: 12/864,373

(22) PCT Filed: Jun. 2, 2008

(86) PCT No.: PCT/CN2008/000944
§ 371 (c)(1),
(2), (4) Date: Jul. 23, 2010

(87) PCT Pub. No.: WO2009/146572
PCT Pub. Date: Dec. 10, 2009

(65) Prior Publication Data
US 2010/0294172 A1  Nov. 25, 2010

(51) Int. Cl.
C04B 28/02 (2006.01)
C04B 14/04 (2006.01)
C04B 14/30 (2006.01)
C04B 22/06 (2006.01)
C04B 22/08 (2006.01)
C04B 24/18 (2006.01)
C04B 24/04 (2006.01)
C04B 111/27 (2006.01)
C04B 103/65 (2006.01)

(52) U.S. Cl. ......... 106/730; 106/728; 106/729; 106/731; 106/732; 106/733; 106/737; 106/813; 106/816

(58) Field of Classification Search ............... 106/728, 106/729, 730, 731, 732, 733, 813, 816
See application file for complete search history.

(56) References Cited

U.S. PATENT DOCUMENTS 7,485,185 B2 * 2/2009 Di Lullo Arias et al. ..... 106/713

FOREIGN PATENT DOCUMENTS

| CN | 1077700 A | 10/1993 |
|---|---|---|
| CN | 1121903 A | 5/1996 |
| CN | 1775706 A | 5/2006 |
| CN | 101003699 A | 7/2007 |
| CN | 201006414 Y | 1/2008 |
| CN | 201052454 Y | 4/2008 |
| CN | 101172215 A | 5/2008 |
| JP | 2002029796 A | 1/2002 |
| RU | 2085527 C1 | 7/1997 |

OTHER PUBLICATIONS

International Search Report issued Jul. 3, 2008 in PCT/CN2008/000944.

* cited by examiner

Primary Examiner — Anthony J Green
(74) Attorney, Agent, or Firm — Pearne & Gordon LLP

(57) ABSTRACT

In this invention a cementitious capillary crystalline waterproof material with an eka-molecular sieve structure and its manufacturing method is disclosed. The major ingredient of this material is Portland cement; the accessories include silicon dioxide, alumina, magnesia, calcium sulphonate, methlycellulose, quick-setting agent and sodium aluminate, etc. Put separately major ingredient and accessories premixed in given proportion separately into the major ingredient bin and the accessory bins. The major ingredient passing through an impulse flowmeter is carried to the dosing machine; and in the same time, the premixed accessories are automatically weighed by the weighing device using gewichtsabnahme method when they are carried to the above dosing machine; they are mixed in the premixing machine and the refine-mixing machine and prepared to the product. The product is mixed with water and forms slurry. After setting, it becomes coating layer with an eka-molecular sieve structure which is water-tight and breathes freely. The coating has high compressive strength, resistance to very high and low temperatures, and resistant to acid, chlorides, and Sulphates so on. It also has self-healing ability to small crack when meet with water. It is non-toxic, odorless, with long service life, and convenient to application. The material can be used at wide range in underground facilities, tunnel, cave depot, bridge, swimming pool, toilet, sewage treating reservoir, dam, etc.

7 Claims, 1 Drawing Sheet

CEMENTITIOUS CAPILLARY CRYSTALLINE WATERPROOF MATERIAL WITH AN EKA-MOLECULAR SIEVE STRUCTURE AND ITS MANUFACTURING METHOD

TECHNICAL FIELD

The invention belongs to a cementitious waterproof coating material and the manufacturing method. It involves a cementitious capillary crystalline waterproof material with an eka-molecular sieve structure and its manufacturing method.

TECHNOLOGY BACKGROUND

In constructional projects, many buildings, such as underground facility, tunnel, cave depot, bridge, marine projects, swimming pool, toilet, sewage treating pond, and dam so on, all have waterproofing and impervious requirements.

Concrete structures need to satisfy the requirements of security, applicability, and durability. Due to premature destruction of many concrete structure facilities under such a severe environment in which pollutions are increased daily, grave safety misadventures and economic losses are caused both in China and abroad. Durability of concrete structure has become a world-wide problem troubling to civil infrastructure projects. If the durability problem was not to pay attention to, then in the near future, the expensive cost several-times more than the initial investment due to repairs and maintenance will be paid. Therefore to resolve the durability problem of concrete structure is a very important and of great urgency.

At present, in order to resolve that problem, although there are many materials and technologies could be chosen, but when considering synthetically from cost, efficiency, and current development situation, to install surface protecting layer for concrete is the most efficient, easy to operate, radical measure at the present time. The starting point of the measure is to make up for a deficiency of concrete structure, to isolate it form the environment, and block effectively penetration of water and other harmful media. Through this surface treatment hydrophobic and to block holes, it can be reached to protect or slow down erosion of environment to concrete structures and to enhance their durability.

For the ordinary concrete, its brittleness is bad, and its waterproof performance is weak, so in its engineering application it is always happened to produce cracks; and the cracks will cause the water resistance to decrease and to appear seepage, and affect the service life of the project, even makes the project can not be used normally.

SUMMARY OF THE INVENTION

The invention was put forward in order to overcome the shortcoming of currently existing techniques. It provides a cementitious capillary crystalline waterproof material with eka-molecular sieve structure and its preparation method. The material in the invention has excellent waterproof and impervious performance, good capillary crystalline character, and can resistant high hydraulic pressure and has self-healing ability to small cracks when meet with water, and has outstanding corrosion resistance.

The material in the invention is a cementitious capillary crystalline waterproof material with eka-molecular sieve structure. The said material is prepared by combining 15%~35% Portland cement with an Accessory I, an Accessory II and an Accessory III, wherein:

Accessory I comprises:

| | |
|---|---|
| Silicon dioxide | 5~25%, |
| Calcium oxide | 5~9.2%, |
| Alumina | 20~30% |
| Ferric oxide | 0.1~0.4%, |
| Sulfur trioxide | 5~10%, and |
| Magnesium oxide | 0.2~0.6%; |

Accessory II comprises:

| | |
|---|---|
| Calcium sulphonate | 0.5~1.0%, |
| Cellulose | 0.4~1.0%, and |
| Silicon dioxide | 6~8%; |

Accessory III comprises:

| | |
|---|---|
| Quick-setting agent | 1~3%, |
| Calcium formate | 0~1.0%, |
| Sodium aluminate | 1~5%, and |
| Silicon dioxide | 7~9%; |

The fineness degrees of various components are as follows:
The Portland cement having a specific surface area of 300~400 $m^2/kg$;
Said silicon dioxide, calcium oxide, alumina, ferric oxide, sulfur trioxide and magnesium oxide, all having a fineness of 200~300 meshes;
Said quick-setting agent having a fineness of 180 mesh; and said calcium formate having a bulk density of 900~1,000 $kg/m^3$.
In an embodiment, said calcium sulphonate having a pH value of 9~12; said cellulose having a viscosity of 10,000~50,000 mPa·s.

The manufacturing method of the invention comprises the following steps:
putting the major ingredient Portland cement meeting the requirement of fineness into the major ingredient bin;
premixing the six materials of silicon dioxide, calcium oxide, alumina, ferric trioxide, sulfur trioxide and magnesia, of the Accessory I which meet their requirements of fineness, and putting them into the accessory bin;
premixing the three materials of calcium sulphonate, cellulose, and calcium dioxide, of the Accessory II, and putting them into the accessory bin;
premixing the four materials of quick-setting agent, calcium formate, sodium aluminate and calcium dioxide of the Accessory III, and putting them into the accessory bin;
the major ingredient is vibrated by the feeding machine, and shed from the major ingredient bin, then sent to the impulse flowmeter by screw conveyer after being treated by screen separation in the screening device, and sent continuously to the dosing machine in required rate through flowmeter;
the amounts of accessories are weighed and adjusted by device using Gewichtsabnahme method according to the prescribed amounts, then the accessories are delivered through accessory adding machines into the dosing machine;

after the completion of matching of the major ingredient and accessories in the dosing machine, they are sent to the premixing machine to premix, and carried to the refine-mixing machine to mix in refinement; and the master controller and remote computer are used to monitor and control all the preparation process.

THE BENEFICIAL EFFECT OF THE INVENTION

The waterproof material has the capillary crystalline characteristics; it can resist high hydraulic press and has self-healing ability to small crack when meet with water. The waterproofing and impervious performance is excellent;

This material has good resistance to very high and low temperatures, to acidulous gas, acidulous water, chlorides and Sulphates with excellent anti-corrosion performance;

The physical performances are excellent; the compressive strength of pure slurry sample of the material is up to more than 30 MPa (on GB18445); its coating makes the compressive strength of the substrate (cement mortar) to increase by more than 10%

The material is non-toxic, odorless, won't cause secondary pollution, has high stability and long service life;

The material has good price performance; the application is convenient, can be applied under normal temperature and on damp substrate surface; all three application methods, trowel coating, brush coating, spray coating can be used; the application procedure is simple with quickly setting and is suitable to various substrate surfaces (new, old or complicated substrate).

BRIEF DESCRIPTION OF THE DRAWINGS

FIG. 1 is flow diagram of the material preparation of the invention. In which,

Figure 1:
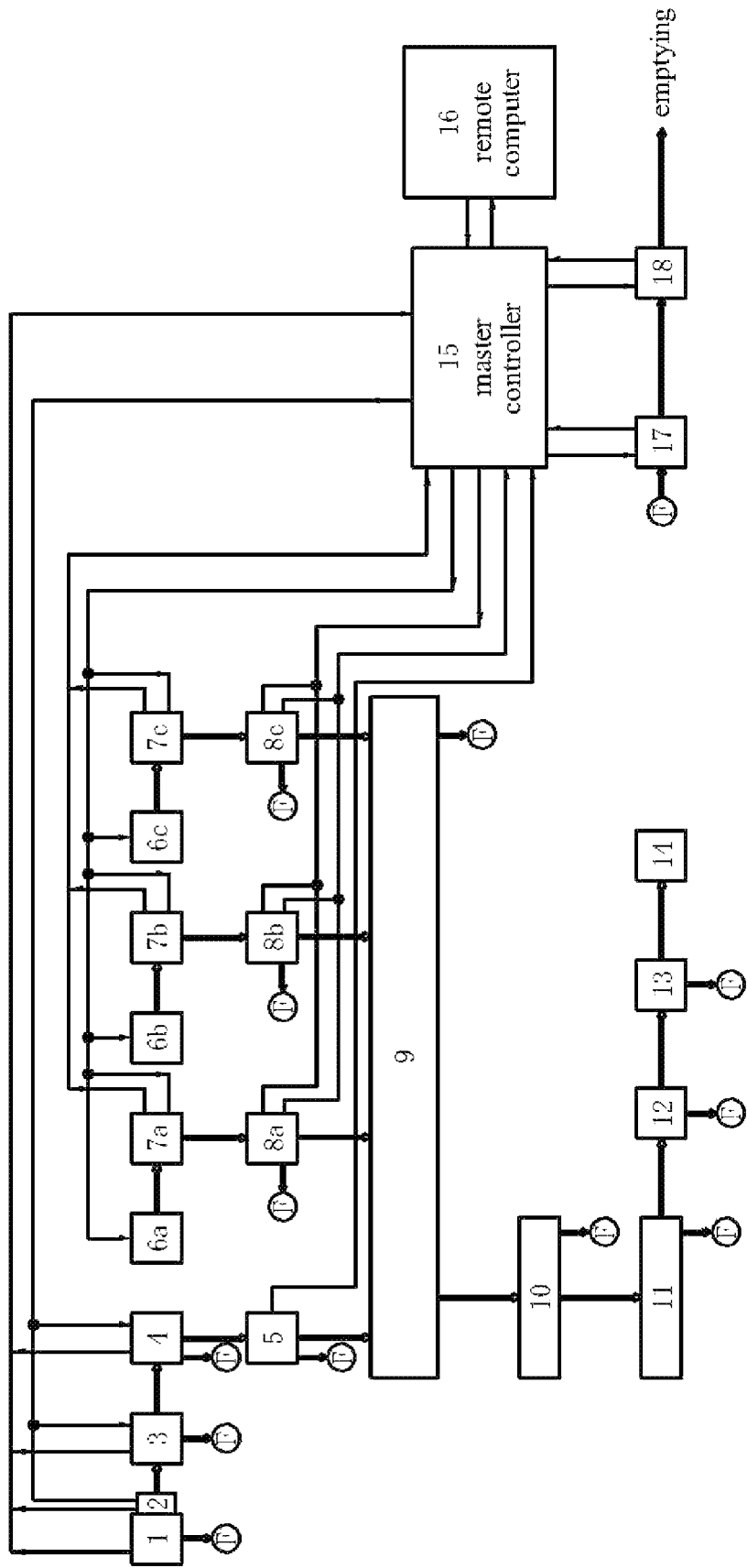

| | | | |
|---|---|---|---|
| 1 | Major ingredient bin | 2 | Feeding machine |
| 3 | Screening device | 4 | Screw conveyer |
| 5 | Impulse flowmeter | 6a, 6b, 6c | Accessory bins |
| 7a, 7b, 7c | Weighing devices using gewichtsabnahme method | | |
| 8a, 8b, 8c | Accessory adding machines | | |
| 9 | Dosing machine | 10 | Premixing machine |
| 11 | Refine-mixing machine | 12 | Finished product bin |
| 13 | Sack-filler | 14 | Shipping department |
| 15 | Master controller | 16 | Remote computer |
| 17 | Negative pressure source | 18 | Tail gas treating unit |
| ⇒ | Material handling line | → | Electric signal line |
| ⇒ | Air line | | |

DETAILED DESCRIPTION OF THE INVENTION

In the following paragraphs, the detail description of the cementitious capillary crystalline waterproof material with eka-molecular sieve structure and its manufacturing method of the invention are given in reference of attachment drawing and implementation sample.

A kind of cementitious capillary crystalline waterproof material with an eka-molecular sieve structure comprises major ingredient, Portland cement, Accessory I, Accessory II, Accessory III; in which Accessory I comprises silicon dioxide ($SiO_2$), calcium oxide (CaO), alumina ($Al_2O_3$), ferric oxide ($Fe_2O_3$), sulfur trioxide ($SO_3$), magnesia (MgO); Accessory II comprises calcium sulphonate (modified lignin), cellulose, and silicon dioxide ($SiO_2$); Accessory III comprises high efficient harden quick-setting agent, calcium formate, sodium aluminate, and silicon dioxide; The weight percentages of their components are as follows, Major ingredient: Portland cement 15~35%;

Accessory I comprises;

| | |
|---|---|
| Silicon dioxide | 5~25%, |
| Calcium oxide | 5~9.2%, |
| Alumina | 20~30%, |
| Ferric oxide | 0.1~0.4%, |
| Sulfur trioxide | 5~10%, and |
| Magnesium oxide | 0.2~0.6%; |

Accessory II comprises;

| | |
|---|---|
| Calcium sulphonate | 0.5~1.0%, |
| Cellulose | 0.4~1.0%, and |
| Silicon dioxide | 6~8%; |

Accessory III comprises;

| | |
|---|---|
| Quick-setting agent | 1~3%, |
| Calcium formate | 0~1.0%, |
| Sodium aluminate | 1~5%, and |
| Silicon dioxide | 7~9%; |

The optimum weight percentages of each component are as follows, Major ingredient: Portland cement 22~30%;

Accessory I comprises;

| | |
|---|---|
| Silicon dioxide | 12~15.6%, |
| Calcium oxide | 6.5~8.0%, |
| Alumina | 22.8~25%, |
| Ferric oxide | 0.2~0.3%, |
| Sulfur trioxide | 6.8~8.0%, and |
| Magnesium oxide | 0.3~0.5%; |

Accessory II comprises;

| | |
|---|---|
| Calcium sulphonate | 0.6~0.75%, |
| Cellulose | 0.6~0.9%, and |
| Silicon dioxide | 6~8%; |

Accessory III comprises;

| | |
|---|---|
| Quick-setting agent | 1.5~2.6%, |
| Calcium formate | 0.3~0.6%, |
| Sodium aluminate | 2~4%, and |
| Silicon dioxide | 7~9%; |

The fineness degrees of various components are as follows:

The Portland cement having a specific surface area of 300~400 $m^2$/kg;

Said silicon dioxide, calcium oxide, alumina, ferric oxide, sulfur trioxide, magnesium oxide and sodium aluminate all having a fineness of 200~300 mesh;

Said quick-setting agent having a fineness of 180 mesh; and said calcium formate having a bulk density of 900~1,000 kg/$m^3$.

In an embodiment, said calcium sulphonate having a pH value of 9~12; said cellulose having a viscosity of 10,000~50,000 mPa·s.

The examples of the invention are listed in the following tables.

| Order | Type | Name | Recruitment (weight %) | | |
|---|---|---|---|---|---|
| | | | Sample 1 | Sample 2 | Sample 3 |
| 1 | Cement | Portland cement | 22 | 25 | 30 |
| 2 | Accessory I | $SiO_2$ | 15.6 | 30 | 12 |
| 3 | | CaO | 6.5 | 7.1 | 8 |
| 4 | | $Al_2O_3$ | 25 | 22.8 | 21 |
| 5 | | $Fe_2O_3$ | 0.3 | 0.25 | 0.2 |
| 6 | | $SO_3$ | 6.8 | 7.5 | 8 |
| 7 | | MgO | 0.3 | 0.4 | 0.5 |
| 8 | Accessory II | Calcium sulphonate | 0.7 | 0.75 | 0.6 |
| 9 | | Cellulose | 0.6 | 0.7 | 0.9 |
| 10 | | $SiO_2$ | 7 | 7 | 7 |
| 11 | Accessory III | Quick-setting agent | 2.6 | 2 | 1.5 |
| 12 | | Calcium formate | 0.6 | 0.5 | 0.3 |
| 13 | | Sodium aluminate | 4 | 3 | 2 |
| 14 | | $SiO_2$ | 8 | 8 | 8 |

The preparation method of the cementitious capillary crystalline waterproof material with eka-molecular sieve structure in this invention is showed as FIG. 1, including the following steps, Put the major ingredient, Portland cement having specific surface of 300~400 m²/kg into the major ingredient bin 1;

According to the weight proportions prescribed above in the invention, premix the six materials of the Accessory I, $SiO_2$, CaO, $Al_2O_3$, $Fe_2O_3$, $SO_3$, MgO, having their fineness of 200~300 mesh, and put them into the accessory bin 6a;

According to the weight proportions prescribed above in the invention, premix the three materials of the Accessory II, calcium sulphonate having pH value of 9~12, cellulose having viscosity of 10,000~4050,000 mPa·s, and silicon dioxide having fineness of 200~300 mesh, and put them into the accessory bin 6b;

According to the weight proportions prescribed above in the invention, premix the four materials of the Accessory III, quick-setting agent having fineness of 180 meshes, calcium formate having bulk density of 900~1000 kg/m³, sodium aluminate and calcium dioxide having fineness of 200~300 mesh, and put them into the accessory bin 6c;

After turning on the power switch, the major ingredient is vibrated by and issues form major ingredient bin 1, then it is treated by screening device 3 and is delivered by screw conveyor 4 to impulse flowmeter 5; its feed-back signal makes feeding machine 2 sending the major ingredient in according to the weight proportions prescribed above in the invention continuously to dosing machine 9.

Accessory I, II, III from accessory bins 6a, 6b, 6c, run through 7a, 7b, 7c weighing devices using gewichtsabnahme method and are sent by accessory adding machines 8a, 8b, 8c according to the weight proportions prescribed above in the invention to the dosing machine 9. After mixing in dosing machine 9, the mixed accessories are sent to premixing machine 10 for premixing of all the materials, and then are sent to refine-mixing machine 11 for refine-mixing into finished product. The product is sent to finished product bin 12, and is packed by sack-filler 13, and then it is sent to shipping department 14. The above connection ways are connection of pipes, which are passage of materials, and represented with hollow arrows.

In order to protect leaking and diffusion of powder, and make the whole system operating under the negative pressure condition, negative pressure source 17 is set up, the suction inlet F of which is connected with the outlet opening F of major ingredient bin 1, screening device 3, screw conveyor 4 of major ingredient, impulse flowmeter 5, accessory adding machines 8a, 8b, 8c, dosing machine 9, premixing machine 10, refine-mixing machine 11, finished product bin 12, and sack-filler 13. While the centrifugal fan is used for the negative pressure source, which vacuum degree $P \leq -20$ mm $H_2O$ column. Tail gas treating unit 18 is connected to negative pressure source 17; the cyclone separating device is used for the tail gas treating unit 18. The air after treating completely reaches the national standard and is allowed to discharge off.

The above connection ways are connection of pipes, which are passage of air, and are represented with heavy line in FIG. 1.

While feeding machine 2 is a vibrating feeder; a six-edge barrel sieve is used for screening device 3; a LSS-10 full-spiral, two-screw conveyor is used for major ingredient screw conveyer 4; a FL-10 impulse flowmeter is used as impulse flowmeter 5; 7a, 7b, 7c weighing devices using gewichtsabnahme method consist of torsion sensors and vibrating feeders, PX dosing machines are used as accessory adding machines 8a, 8b, 8c; a LSS-10 full-spiral, two-screw conveyor and a LSS-16 paddle screw conveyor are used separately for dosing machine 9 and premixing machine 10; refine-mixing machine 11 consists of a LSS-16 paddle screw conveyor and a vibrating motor; Dell 2900III server is used for master controller 15; And Dell XPS 73C computer is used as remote computer 16.

The monitoring and controlling process of the preparation method of this invention is as follows, The major ingredient bin 1 sends a signal for material level to master controller 15, and the master controller 15 calculates and decides whether the major ingredient bin 1 is needed to feed material. The feeding machine 2 sends a current operating condition signal to the master controller 15; it calculates and gives a feed-back signal to control the operation condition of the feeding machine 2. Screening device 3 sends its current operating condition signal to the master controller 15; and a feed-back signal from which gives a controlled condition. The major ingredient conveyor 4 sends its current operating condition signal to the master controller 15; through calculating it gives a feed-back to control the operating condition.

Impulse flowmeter 5 gives a signal about the flow rate of major ingredient to the master controller 15; it calculates the proper flow rates of accessories and sends the signals for the flow rates of accessories separately to 7a, 7b, 7c weighing devices using gewichtsabnahme method and accessory adding machines 8a, 8b, 8c; according to the received signals for accessories flow rates, the accessory adding machines 8a, 8b, 8c change their power frequencies of frequency converters to change the rotating speeds of screw conveyors and to change the delivered quantities according to the prescribed accessories quantities, and send the feed-back signals of the carried out results to the master controller 15; 7a, 7b, 7c weighing devices using gewichtsabnahme method monitor the weight changes of accessory bins 6a, 6b, 6c, according to the calculated results given by master controller 15, and send signals to master controller 15 in order to adjust the operations of accessory bins 6a, 6b, 6c.

The remote calculator 16 connects with the master controller 15; it monitors and controls the whole technical process from distance.

Above connection ways are electric signal connections, which are represented with fine solid arrows.

The preparation method of this invention achieves anticipatory controlling of accessory flow late, which guarantees accuracy, stability, and consistency of ingredients matching of the product, and meets requirement for fineness of various-purpose products, makes production line to have functions of one-button sequence starting, one-button sequence stopping, and interlocking to various links of the process. It can also protects materials from powder-leak and diffusion during process of conveying, mixing, and packing so on, so that avoids polluting to environment and is friendly to the environment.

When the powder product prepared by the method of this invention is mixed with water using the ratio of water to powder being 0.3~0.4 and after setting of the made slurry, a eka-molecular sieve structure will be formed, that is to produce the cementitious capillary crystalline waterproof material with eka-molecular sieve structure which has porosity of aperture being 10~20 Å and can breath at the same time is watertight.

The invention claimed is:

1. A cementitious capillary crystalline waterproof material with an eka-molecular sieve structure, said material being prepared by combining 15%~35% Portland cement with an Accessory I, an Accessory II and an Accessory III, wherein:

Accessory I comprises:

| | |
|---|---|
| Silicon dioxide | 5~25%, |
| Calcium oxide | 5~9.2%, |
| Alumina | 20~30%, |
| Ferric oxide | 0.1~0.4%, |
| Sulfur trioxide | 5~10%, and |
| Magnesium oxide | 0.2~0.6%; |

Accessory II comprises:

| | |
|---|---|
| Calcium sulphonate | 0.5~1.0%, |
| Cellulose | 0.4~1.0%, and |
| Silicon dioxide | 6~8%; |

Accessory III comprises:

| | |
|---|---|
| Quick-setting agent | 1~3%, |
| Calcium formate | 0~1.0%, |
| Sodium aluminate | 1~5%, and |
| Silicon dioxide | 7~9%; | wherein all percentages set forth above are percentages by weight in said material.

2. The material set forth in claim 1, prepared by combining 22~30% Portland cement with said Accessory I, II and III wherein:

Accessory I comprises:

| | |
|---|---|
| Silicon dioxide | 12~15.6%, |
| Calcium oxide | 6.5~8.0%, |
| Alumina | 22.8~25%, |
| Ferric oxide | 0.2~0.3%, |
| Sulfur trioxide | 6.8~8.0%, and |
| Magnesium oxide | 0.3~0.5%; |

Accessory II comprises:

| | |
|---|---|
| Calcium sulphonate | 0.6~0.75%, |
| Cellulose | 0.6~0.9%, and |
| Silicon dioxide | 6~8%; |

Accessory III comprises:

| | |
|---|---|
| Quick-setting agent | 1.5~2.6%, |
| Calcium formate | 0.3~0.6%, |
| Sodium aluminate | 2~4%, and |
| Silicon dioxide | 7~9%; | wherein all percentages set forth above are percentages by weight in said material.

3. The material set forth in claim 1, said Portland cement having a specific surface area of 300~400 m$^2$/kg;
said silicon dioxide, calcium oxide, alumina, ferric oxide, sulfur trioxide, magnesium oxide and sodium aluminate having a fineness of 200~300 meshes;
said quick-setting agent having a fineness of 180 meshes; and
said calcium formate having a bulk density of 900~1,000 kg/m$^3$.

4. The material set forth in claim 1, said calcium sulphonate having a pH value of 9~12; said cellulose having a viscosity of 10,000~50,000 mPa·s.

5. The material set forth in claim 1, said Portland cement having a specific surface area of 300~400 m$^2$/kg;
said silicon dioxide, calcium oxide, alumina, ferric oxide, sulfur trioxide, magnesium oxide and sodium aluminate having a fineness of 200~300 mesh; and
said calcium formate having a bulk density of 900~1,000 kg/m$^3$.

6. A method for the preparation of cementitious capillary crystalline waterproof material with eka-molecular sieve structure, comprising the following steps:
a) providing Portland cement having a specific surface area of 300~400 m$^2$/kg in an amount of 15%~25% by weight calculated based on the weight of said material;
b) premixing 5%~25% silicon dioxide, 5%~9.2% calcium oxide, 20%~30% alumina, 0.1%~0.4% ferric trioxide, 5%~10% sulfur trioxide and 0.2%~0.6% magnesium trioxide, all having a fineness of 200~300 mesh, to form Accessory I;
c) premixing 0.5%~1.0% calcium sulphonate having a pH value of 9~12, 0.4%~1.0% cellulose having a viscosity of 10,000~50,000 mPa·s, and 6%~8% silicon dioxide having a fineness of 200~300 mesh to form Accessory II;
d) premixing 1%~3% quick-setting agent having a fineness of 180 meshes, 0%~1% calcium formate having a bulk density of 900~1000 kg/m$^3$, 1%~5% sodium aluminate having a fineness of 200~300 mesh and 7%~9% silicon dioxide to form Accessory III;

e) vibrating said Portland cement and treating said Portland cement by screen separation in a screening device followed by carrying said Portland cement by screw conveyor to an impulse flowmeter in which its flow rate is measured to deliver said Portland cement continuously to a dosing machine;

f) weighing the respective Accessories I, II and III method and continuously delivering said Accessories I, II and III into the dosing machine;

g) delivering said Portland cement and Accessories I, II and III from the dosing machine to a premixing machine to premix them and thereafter delivering the premixed Portland cement and Accessories I, II and III to a refine-mixing machine to mix them in refinement; and h) using a master controller and remote computer to monitor and control the aforementioned steps;

wherein all percentages of components in Accessories I, II and III are percentages by weight calculated based on said material, and wherein all said weighing and delivering steps are controlled to produce said material having all of said components in the recited weight percents.

7. A method for the preparation of cementitious capillary crystalline waterproof material with eka-molecular sieve structure, comprising the following steps:

a) providing Portland cement having a specific surface area of 300~400 m$^2$/kg in an amount of 15%~25% by weight calculated based on the weight of said material;

b) premixing 5%~25% silicon dioxide, 5%~9.2% calcium oxide, 20%~30% alumina, 0.1%~0.4% ferric trioxide, 5%~10% sulfur trioxide and 0.2%~0.6% magnesium trioxide, all having a fineness of 200~300 mesh, to form Accessory I;

c) premixing 0.5%~1.0% calcium sulphonate having a pH value of 9~12, 0.4%~1.0% cellulose having a viscosity of 10,000~50,000 mPa·s, and 6%~8% silicon dioxide having a fineness of 200~300 mesh to form Accessory II;

d) premixing 1%~3% quick-setting agent, 0%~1% calcium formate having a bulk density of 900~1000 kg/m$^3$, 1%~5% sodium aluminate having a fineness of 200~300 mesh and 7%~9% silicon dioxide to form Accessory IIII;

e) vibrating said Portland cement and treating said Portland cement by screen separation in a screening device followed by carrying said Portland cement by screw conveyor to an impulse flowmeter in which its flow rate is measured to deliver said Portland cement continuously to a dosing machine;

f) weighing the respective Accessories I, II and III and continuously delivering said Accessories I, II and III into the dosing machine;

g) delivering said Portland cement and Accessories I, II and III from the dosing machine to a premixing machine to premix them and thereafter delivering the premixed Portland cement and Accessories I, II and III to a refine-mixing machine to mix them in refinement; and h) using a master controller and remote computer to monitor and control the aforementioned steps;

wherein all percentages of components in Accessories I, II and III are percentages by weight calculated based on said material, and wherein all said weighing and delivering steps are controlled to produce said material having all of said components in the recited weight percents.

* * * * *

UNITED STATES PATENT AND TRADEMARK OFFICE
CERTIFICATE OF CORRECTION

| | | |
|---|---|---|
| PATENT NO. | : 7,901,506 B2 | Page 1 of 1 |
| APPLICATION NO. | : 12/864373 | |
| DATED | : March 8, 2011 | |
| INVENTOR(S) | : Huidong Zhang | |

It is certified that error appears in the above-identified patent and that said Letters Patent is hereby corrected as shown below:

At Column 2, Line 34, replace "meshes" with "mesh".

At Column 5, Line 44, replace "4050,000" with "50,000".

In Claim 3 at Column 8, Line 33, replace "meshes" with "mesh".

In Claim 3 at Column 8, Line 34, replace "meshes" with "mesh".

In Claim 6 at Column 8, Line 64, replace "meshes" with "mesh".

In Claim 6 at Column 9, Line 7, delete the word "method".

Signed and Sealed this
Nineteenth Day of April, 2011

David J. Kappos
*Director of the United States Patent and Trademark Office*